US008240448B2

(12) United States Patent
Hongawara et al.

(10) Patent No.: US 8,240,448 B2
(45) Date of Patent: Aug. 14, 2012

(54) PARKING DEVICE OF TRANSMISSION

(75) Inventors: Narihito Hongawara, Hiroshima (JP); Tomoyuki Hata, Hiroshima (JP); Yuichi Honda, Hiroshima (JP); Tatsuhiko Iwasaki, Hiroshima (JP)

(73) Assignee: Mazda Motor Corporation (JP)

( * ) Notice: Subject to any disclaimer, the term of this patent is extended or adjusted under 35 U.S.C. 154(b) by 228 days.

(21) Appl. No.: 12/826,526

(22) Filed: Jun. 29, 2010

(65) Prior Publication Data

US 2011/0005891 A1   Jan. 13, 2011

(30) Foreign Application Priority Data

Jul. 13, 2009 (JP) .................................. 2009-164636

(51) Int. Cl.
*B60T 1/06* (2006.01)

(52) U.S. Cl. ......... 192/219.5; 188/31; 188/69; 74/411.5

(58) Field of Classification Search ................ 192/219.5
See application file for complete search history.

(56) References Cited

U.S. PATENT DOCUMENTS

| 2,875,856 | A | * | 3/1959 | Mrlik et al. .................... 188/69 |
| 3,213,968 | A | * | 10/1965 | Platz .............................. 188/69 |
| 3,690,416 | A | * | 9/1972 | Yamada ......................... 188/69 |
| 4,606,242 | A | * | 8/1986 | Hasegawa et al. ......... 74/606 R |
| 6,164,427 | A | * | 12/2000 | Ogawa ....................... 192/219.5 |
| 6,510,934 | B2 | * | 1/2003 | Arakawa .................... 192/219.5 |

FOREIGN PATENT DOCUMENTS

JP     2007-326438 A     12/2007

* cited by examiner

*Primary Examiner* — Richard M. Lorence
(74) *Attorney, Agent, or Firm* — Studebaker & Brackett PC; Donald R. Studebaker (57) ABSTRACT

According to an operation of a shift lever to parking range, a cam member at a parking rod comes in between a parking pole and a support member, and the parking pole swings so that a pawl portion of the parking rod can engage with a parking gear. A concave holding portion to hold the support member is formed at a transmission case. The support member comprises a first cylindrical outer face having a first radius R1 which is supported in a concave inner face the concave holding portion to rotate in a specified range and a second cylindrical outer face (cam-contact portion) having a second radius R2 which contacts a cam member. The first radius R1 has a center which is located at the same position as that of the second radius R2. Herein, R2 is shorter than R1.

8 Claims, 7 Drawing Sheets

PRIOR ART

PARKING DEVICE OF TRANSMISSION

BACKGROUND OF THE INVENTION

The present invention relates to a parking device of a transmission which may be installed in automotive vehicles.

In general, the transmission for automotive vehicles has the parking device to prevent the vehicle parked on a slope from moving unexpectedly. The parking device comprises a parking gear provided at a rotational member on an output side of the transmission, a parking pole to swing and make its pawl portion lock the parking gear through their engagement, and a parking rod to move together with an operation of a shift lever by a driver and have a cam portion press the parking pole for their engagement according to the operation of the shift lever.

Further, the parking device comprises a support member which is provided beside the cam portion of the parking rod on an opposite side to the parking pole. This support member receives a reaction force which acts on the cam portion of the parking rod which occurs in case of pressing of the cam portion against the parking pole, so that the engagement between the parking pole and the parking gear can be held properly.

Figure 9:
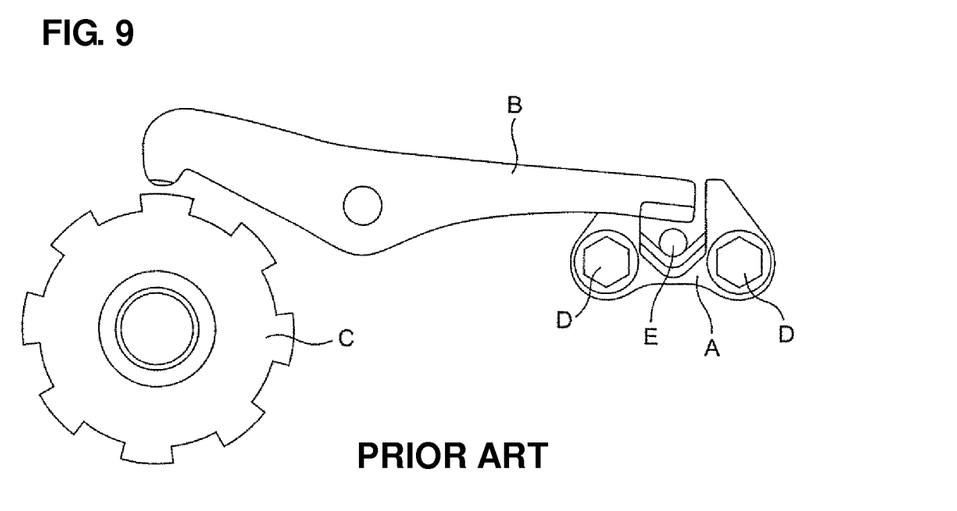
FIG. 9 is an explanatory diagram showing a conventional parking device.

In this case, according to the parking device disclosed in Japanese Patent Laid-Open Publication No. 2007-326438, a support member A is fixed to a transmission case by bolts D, D, as shown in FIG. 9, so that the support member A can receive the reaction force which occurs in case of the engagement between a parking pole B and a parking gear C.

Herein, the attaching position of the support member A to the transmission case is affected by the swing position of the parking pole B in case of a cam portion of a parking rod E pressing the parking pole B, that is, the engagement state of a pawl portion of the parking pole B and the parking gear C. Therefore, when it is attached to the transmission case, the support member is fixed by the bolts after its attaching position is restricted by a positioning pin.

However, in case plural bolts are used for the fixing or both the bolts and the positioning pin are used when the support member is supported at the transmission case, the structure of supporting the support member would become complex, the number of parts would increase, and the attaching work of the support member to the transmission case would become troublesome.

In the above-described conventional structure, moreover, the reaction force in case of the pressing of the parking pole against the parking gear acts on the bolts or the positioning pin which support the support member as a shearing force or a bending force. Accordingly, the support rigidity of the support member would be improperly insufficient. Meanwhile, the parts would become improperly large sized in order to solve this problem.

SUMMARY OF THE INVENTION

An object of the present invention is to provide a parking device of a transmission which can decrease the number of parts, improve the attaching work, obtain the proper operation by maintaining a constant state of the cam portion of the parking rod pressing the parking pole, and hold the support member firmly against the reaction for the superior operation and durability.

According to the present invention, there is provided a parking device of a transmission, comprising a parking gear provided in a transmission case at a rotational axis which rotates together with a wheel axel, a parking pole provided in the transmission case so as to swing, the parking pole having a pawl portion which locks the parking gear through an engagement therebetween, a parking rod provided in the transmission case so as to move together with an operation of a shift lever, the parking rod having a cam portion which presses the parking pole so as to make the engagement between the pawl portion of the parking pole and the parking gear according to the operation of the shift lever, a support member provided in the transmission case beside the cam portion of the parking rod on an opposite side to the parking pole so as to be held at the transmission case, the support member receiving a reaction force which acts on the cam portion which occurs in case of pressing of the cam portion against the parking pole, and a concave holding portion formed at the transmission case so as to hold the support member, wherein the support member comprises a first cylindrical outer face having a curvature of a first radius which is positioned on the side of said concave holding portion so as to contact and slide along a concave inner face of said concave holding portion in a specified range of a rotational direction and a second cylindrical outer face having a curvature of a second radius which is positioned on the side of said cam portion of the parking rod so as to contact and slide on a surface of the cam portion, the curvature of the first radius of said first cylindrical outer face having a center which is located at the same position as that of the curvature of the second radius of said second cylindrical outer face, the second radius being smaller than the first radius.

According to the present invention, since the support member comprises the first cylindrical outer face which contacts and slides along the concave inner face of the concave holding portion, the support member is properly held by the concave holding portion formed at the transmission case via its cylindrical outer face. Further, since the support member is allowed to rotate in the concave holding portion in the specified range, the attachment of the support member to the transmission case can be conducted properly by simply inserting the member into the concave holding portion. Accordingly, this attachment can be easier compared with the conventional manner. Further, there may be no need of positioning with any positioning pin or fixing with any bolt. Moreover, the attaching work can be made easier and the number of parts can be decreased properly.

Meanwhile, since the support member comprises the second cylindrical outer face which has the curvature of the second radius having the same center as the curvature of the first radius of the first cylindrical outer face, even if the support member rotates in the above-described specified range when the cam portion presses the parking pole, the contact position of the support member with the cam portion can be maintained always at a constant position relative to the transmission case. Accordingly, the reaction force which acts on the cam portion can be always received by the support member at the same position when the cam portion presses the parking pole, so that the pressing position and timing of the cam portion against the parking pole and the magnitude and direction of the pressing load can be stabilized, so that the proper operation can be obtained.

Further, the reaction inputted to the support member from the cam portion is directly transmitted to the first cylindrical outer face of the support member, and then received by the concave inner face of the concave holding portion which contacts this first cylindrical outer face of the support member in a wide range. Accordingly, the support member can be held firmly. Thereby, the proper operation in case of engaging the parking pole with the parking gear and the superior durability can be obtained as well.

According to an embodiment of the present invention, a guide member to guide movement of the cam portion of the parking rod is fixed to the transmission case, and the guide member contacts an inside end face of the support member so that the support member can be prevented from dropping from the concave holding portion. Thereby, since the member which prevents the support member from dropping from the concave holding portion by contacting the inside end face of the support member functions also as a guide member which guides the movement of the cam portion of the parking rod, the proper holing of the support member can be achieved without increasing the number of parts.

According to another embodiment of the present invention, a step portion is formed at the inside end face of the support member so as to restrict an over rotation of the support member beyond the specified range of the rotational direction by engaging with the guide member. Thereby, the support member can be held through the engagement of the guide member with the step portion formed at the inside end face of the support member. Herein, properly setting the engagement between the step portion and the guide member enables the rotatable range of the support member to be set easily. Accordingly, it may not be necessary to provide any additionally particular structure for setting the rotatable range of the support member, so that complexity of the structure can be restrained.

According to another embodiment of the present invention, a detent plate to move the parking rod together with the operation of the shift lever is provided, and a detent spring to constitute a positioning mechanism of the shift lever along with the detent plate is attached to the guide member. Thereby, since the detent spring to constitute the positioning mechanism of the shift lever is attached to the guide member, it may not be necessary to provide any additionally particular member to attach the detent spring, so that complexity of the structure can be further restrained.

According to another embodiment of the present invention, the cam portion of the parking rod moves substantially in a swing face of the parking pole. Thereby, since the cam portion of the parking rod moves substantially along the swing face of the parking pole, the pressing force is directed substantially along the swing face of the parking pole in case of the cam portion pressing the parking pole. Accordingly, it can be restrained that any other component force than the force acting in the swing direction acts on the parking pole, so that the parking pole can be moved smoothly.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
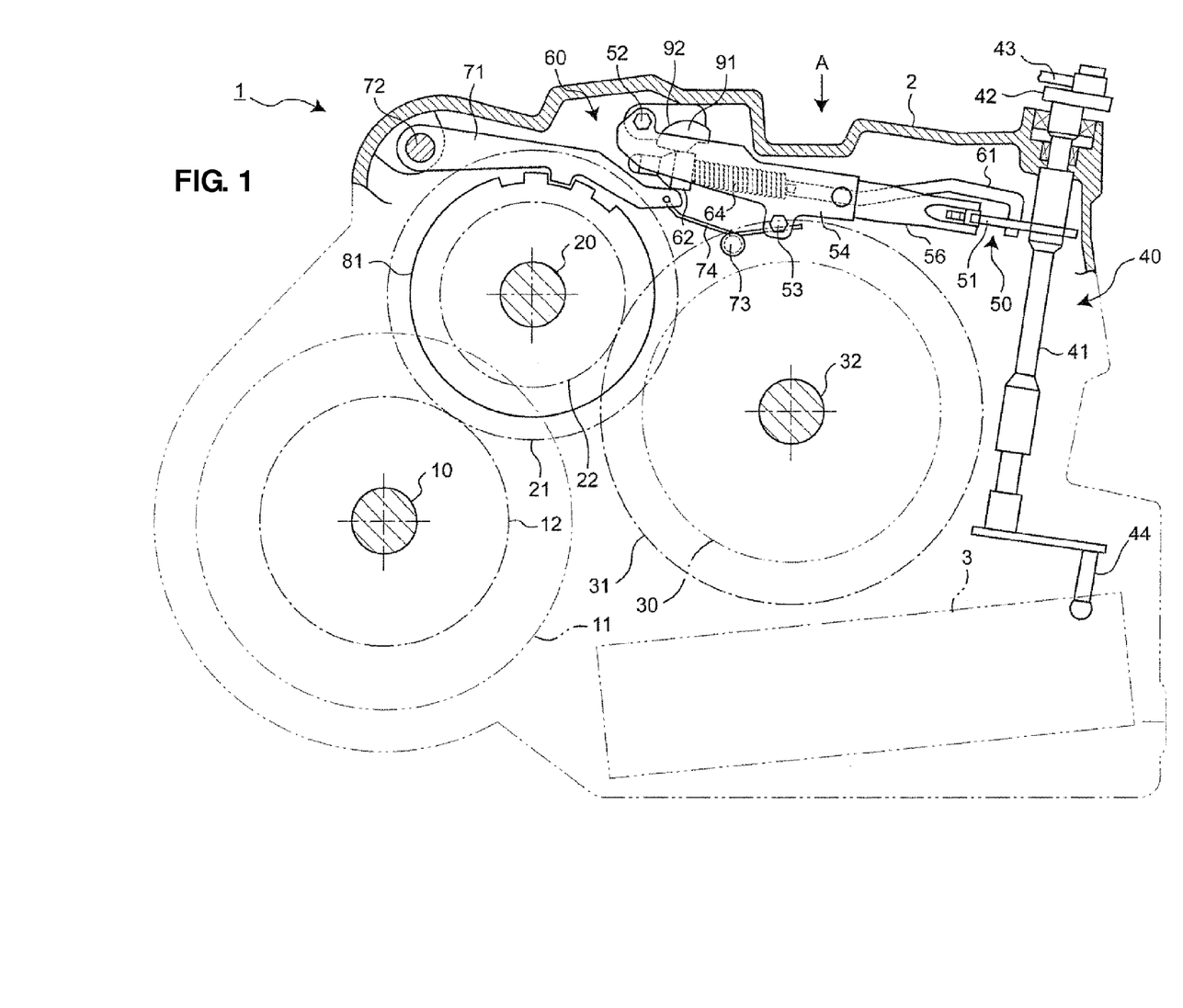
FIG. 1 is a vertical sectional view of a major part of a transmission according to an embodiment of the present invention.

FIG. 1 shows a schematic sectional structure of a transmission for a front-engine front-drive vehicle. This transmission 1 comprises a primary shaft 10 which is arranged coaxially with an output shaft (not shown) of an engine, a secondary shaft 20 which is arranged rearward and above the secondary shaft 20, and a differential gear 30 having its axis arranged rearward and below the secondary shaft 20.

The output of the engine is changed in speed through a transmission mechanism 11 on the primary shaft 10 according to the engine operating condition, and then transmitted to a first gear 21 on the secondary shaft 20 from an output gear 12. Then, it is transmitted from a second gear 22 on the secondary shaft 20 to a ring gear 31 of the differential gear 30, and eventually to both vehicle axels 32, 32 (only one is illustrated) via the differential gear 30.

The transmission 1 further comprises a manual operation mechanism 40 which is coupled to a shift lever (not illustrated) operated by a driver. This manual operation mechanism 40 comprises a manual shaft 41 which is rotatably supported at a transmission case 2. A cable 43 from the shift lever is coupled to a bracket 42 provided at a top end of the manual shaft 41. This shift lever's operation rotates the manual shaft 41 via the cable 43 and the bracket 42. Then, a valve operating member 44 provided at a lower end portion of the manual shaft 41 operates a manual valve (not illustrated) in an oil control unit 3 arranged at a lower portion in the transmission case 2. Thus, an oil-pressure control depending on selection of the shift lever is executed.

Figure 2:
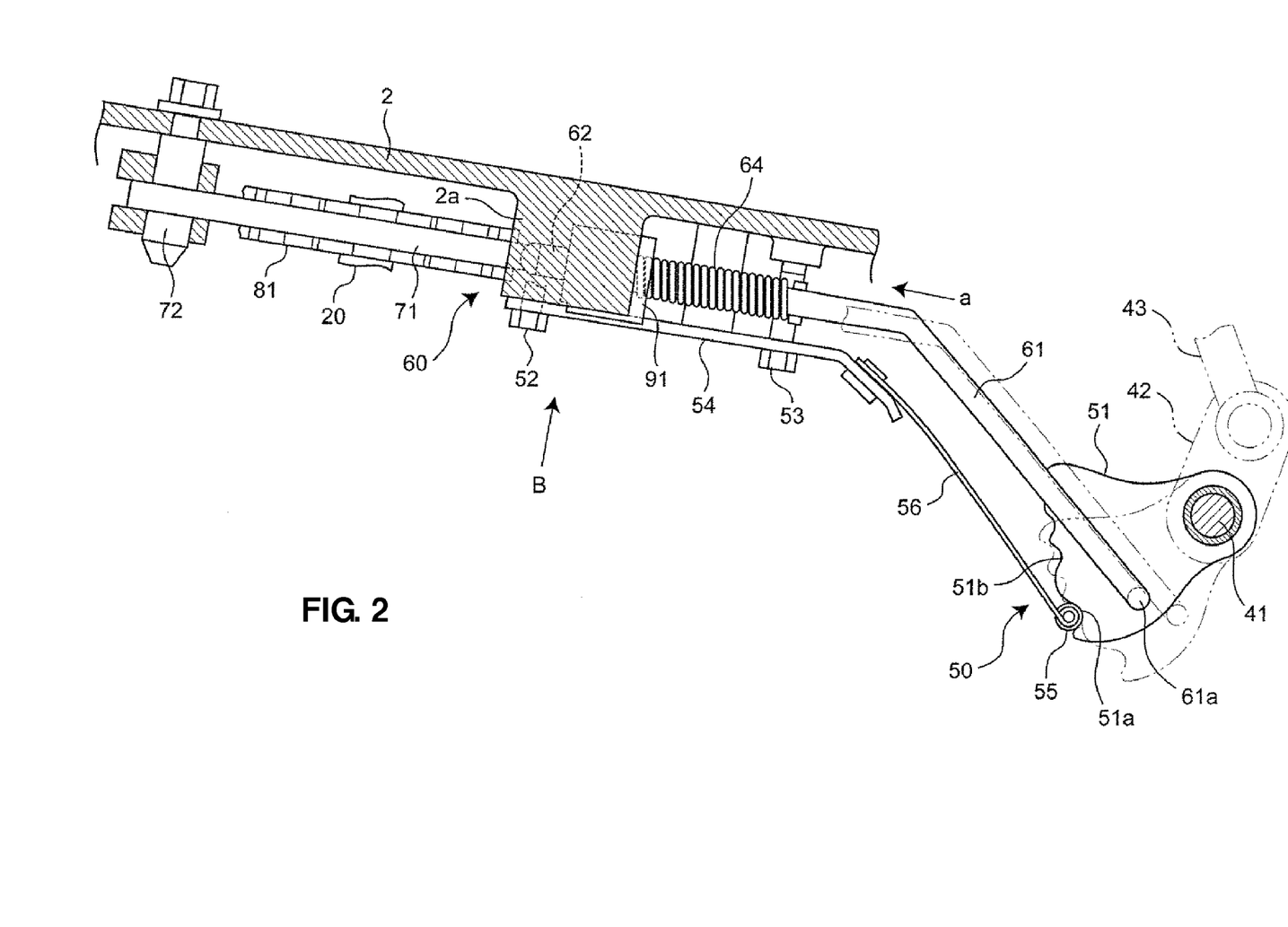
FIG. 2 is a plan view of a positioning mechanism and a parking mechanism, when viewed along an arrow A of FIG. 1.
Figure 3:
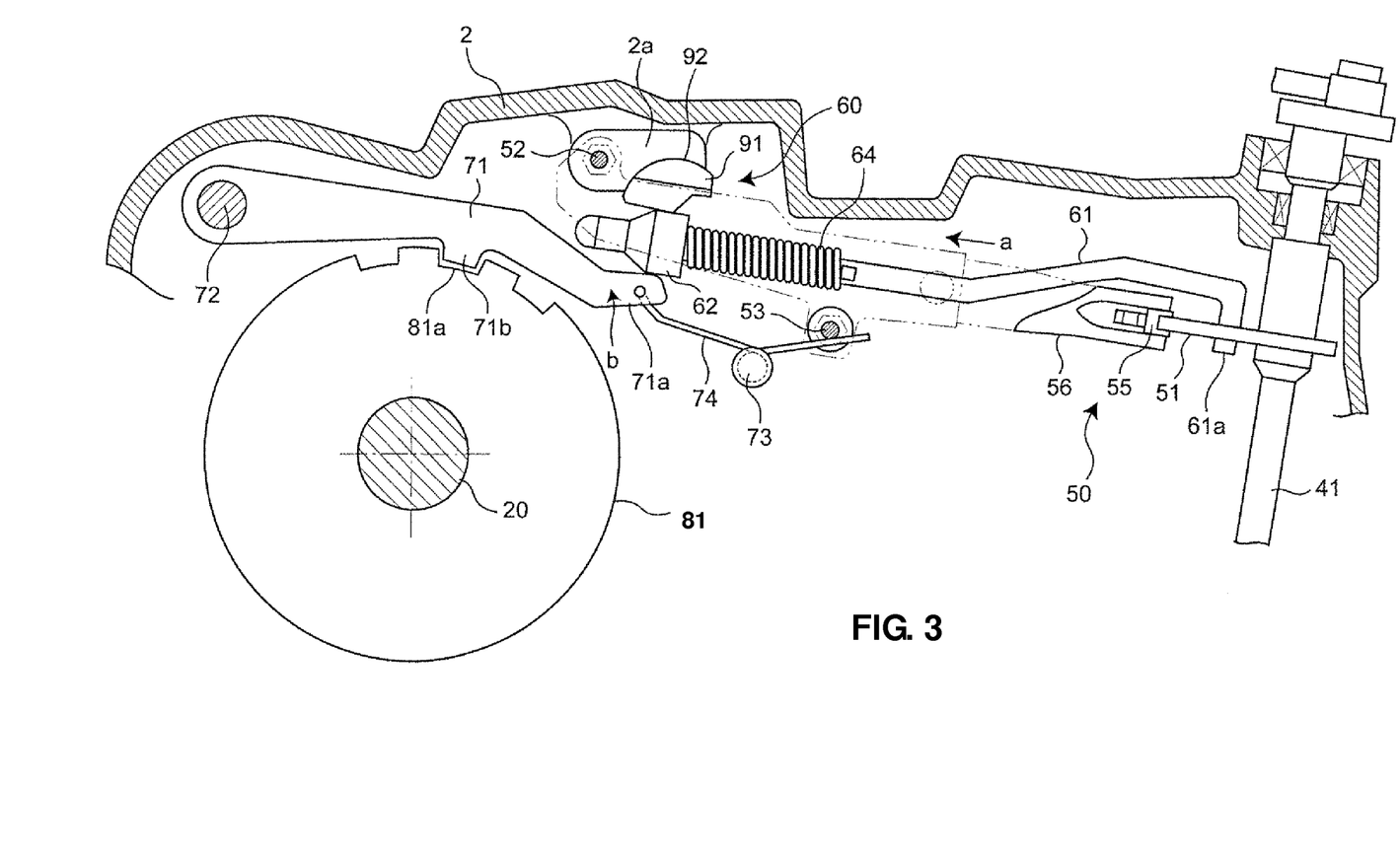
FIG. 3 is an elevation view of the positioning mechanism and the parking mechanism, when viewed along an arrow B of FIG. 2.

The manual operation mechanism 40 comprises a positioning mechanism 50 which positions the shift lever or the manual shaft 41 at respective range positions. This positioning mechanism 50 comprises, as shown in FIGS. 2 and 3, a detent plate 51 which is attached to the manual shaft 41 and rotates together with this shaft 41, a bracket 54 which is attached to the transmission case 2 with bolts 52, 52 and functions also as a guide member of a guide member 62 in a parking mechanism 60, which will be described later, and a detent spring 56 which has its base end portion fixed to the bracket 54 and its tip portion having a roller 55.

Herein, the roller 55 resiliently engages with concave portions 51a, 51b . . . which are formed at the detent plate 51 so as to correspond to respective ranges at the respective range positions of the shift lever or the manual shaft 41. Thereby, the shift lever or the manual shaft 41 is positioned at the respective range positions. FIG. 2 shows a state where the shift lever or the manual shaft 41 is positioned at a parking range.

Further, the manual operation mechanism 40 comprises the parking mechanism 60 which locks the axels 32, 32 through the differential gear 30 when the shift lever is shifted to the parking range. This parking mechanism 60 comprises, as shown in FIGS. 2 and 3, a parking rod 61, a parking pole 71, and a parking gear 81 as main components. A rear end portion 61a of the parking rod 61 engages with the detent plate 51 of the positioning mechanism 50, and when the detent plate 51 rotates from its position illustrated by a broken line in FIG. 2 to the parking range position according to the operation of the shift lever, the parking rod 61 moves in the direction of an arrow a.

Figure 4:
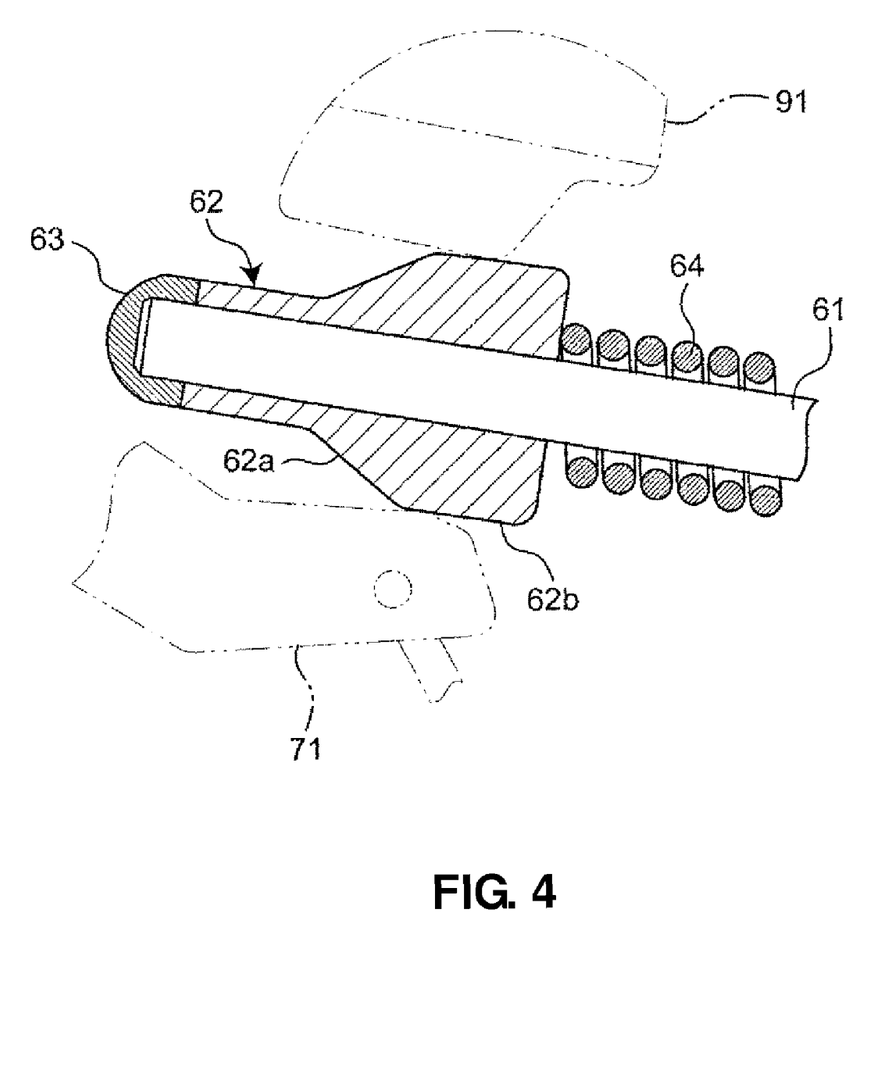
FIG. 4 is an enlarged sectional view showing a structure of a cam member.

The parking rod 61 has a cam member 62 at its tip end portion. This cam member 62 comprises, as shown in FIG. 4, a corn portion 62*a* at its central portion and a cylindrical portion 62*b* at a rear portion subsequent from the corn portion 62*a*, and is provided so as to slide on the tip end portion. The cam member 62 is biased forward by a spring 64 which is arranged along the parking rod 61 until it contacts a stopper 63 fixed to the tip of the parking rod 61. Thus, the guide member (bracket) 54 guides the cam member 62 forward in case the parking rod 61 moves in the direction of the arrow a.

Meanwhile, as shown in FIGS. 2 and 3, the parking pole 71 is supported at the transmission case 2 so as to swing via a pivot axis 72 provided at its rear end, and this parking pole 71 is arranged so that it extends toward the cam member 62 of the tip end portion of the parking rod 61 and that its tip end portion 71*a* is positioned right below the cam member 62.

Further, as shown in FIG. 3, the parking rod 71 is biased by a spring 74 so that its tip end portion 71*a* moves in the direction of an arrow b and contacts a lower face of the cam member 62. Herein, one end of the spring 74 engages with a bolt 53 which fixes the guide member 54 to the transmission case 2, and the other end of the spring 74 engages with the parking rod 71.

Moreover, a pawl portion 71*b* is formed at the central portion of the parking rod 71. This pawl portion 71*b* projects downward so as to face to an upper gear face of the parking gear 81 which is fixed to the secondary shaft 20 shown in FIG. 1 between the first and second gears 21, 22. In case the parking pole 71 swings in the direction of the arrow b as illustrated, the pawl portion 71*b* engages with a concave portion 81*a* between any gear teeth, thereby locking rotation of the gear 81.

Figure 5:
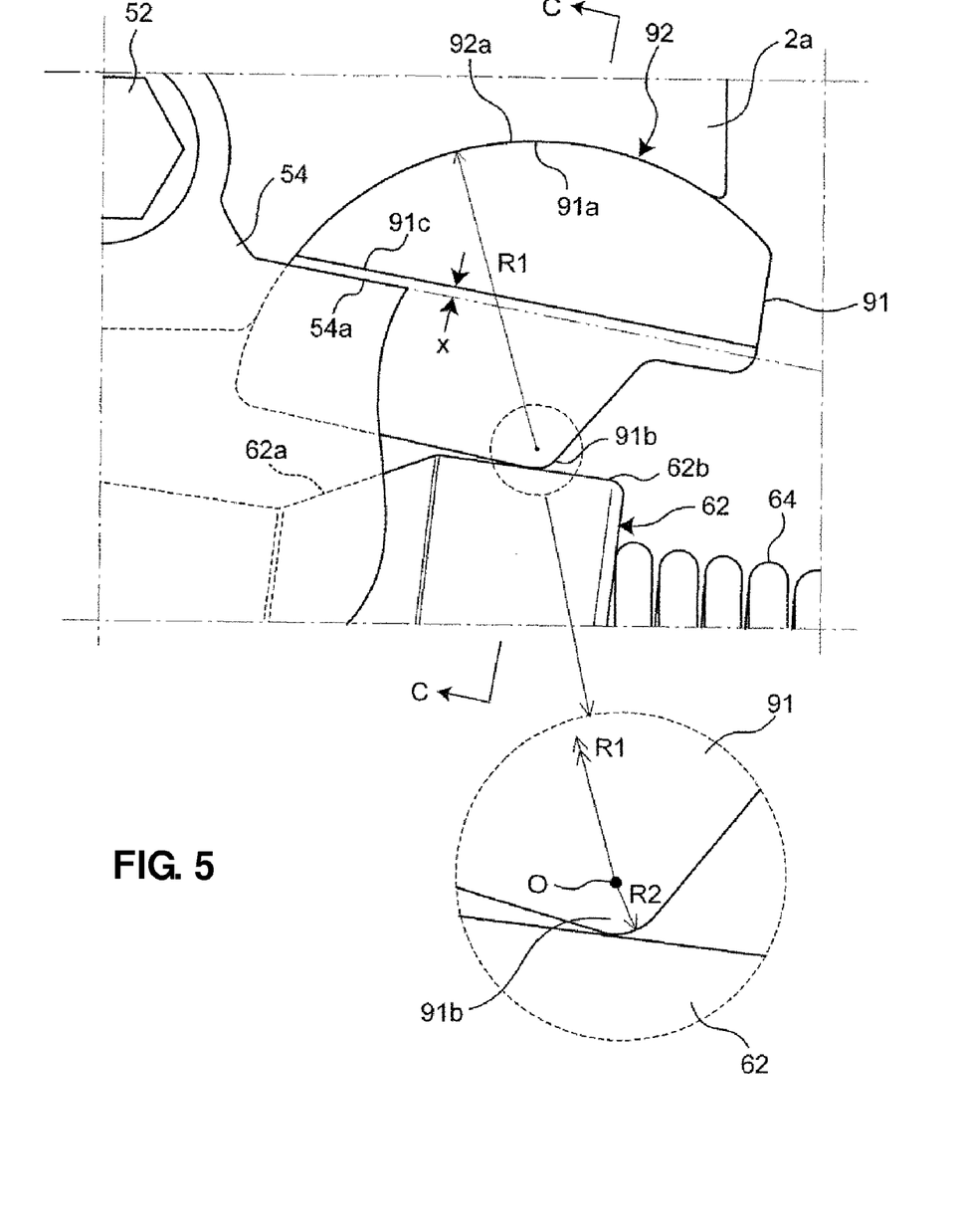
FIG. 5 is an enlarged view of a support member.
Figure 6:
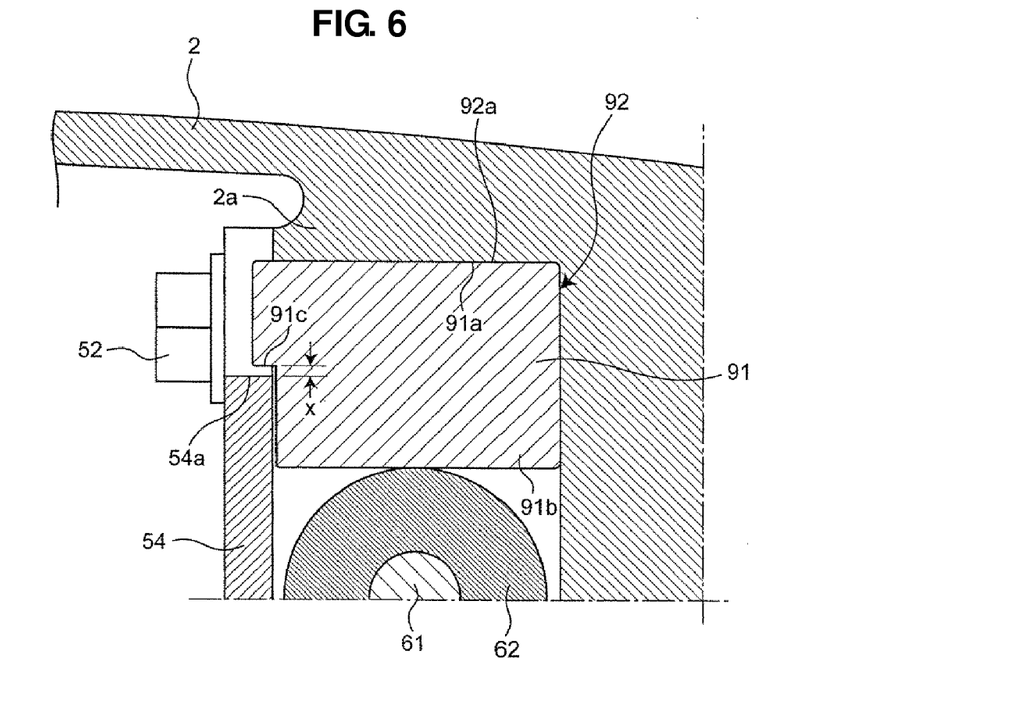
FIG. 6 is a sectional view taken along line C-C of FIG. 5.

The parking mechanism 60 further comprises a support member 91, which is provided above the cam member 62 of the parking rod 61 on an opposite side to the tip end portion 71*a* of the parking pole 71 so as to be held by a concave holding portion 92 formed at a thick portion 2*a* formed at an inner face of the transmission case 2 as shown in FIGS. 5 and 6.

The support member 91 comprises a first cylindrical outer face 91*a* which has a curvature of a first radius R1 which is positioned on the side of the concave holding portion 92 so as to contact and slide along a concave inner face 92*a* of the concave holding portion 92 and a second cylindrical outer face (cam-contact portion) 91*b* which has a curvature of a second radius R2 which is positioned on the side of the cam member 62 so as to contact and slide on a surface of the cam member 62. The curvature of the first radius R1 of the first cylindrical outer face 91*a* has a center O which is located at the same position as that of the curvature of the second radius R2 of the second cylindrical outer face (cam-contact portion) 91*b*. Herein, the above-described second radius R2 is smaller than the above-described first radius R1.

The guide member 54 extends across in front of an inside end face of the support member 91 so that the support member 91 can be prevented from dropping from the above-described concave holding portion 92.

A step face 91*c* is formed at the inside end face of the support member 91. Herein, the step face 91*c* faces to an upper end face 54*a* of the guide member 54, and an upper portion of the step face 91*c* projects toward the inside of the transmission case from a lower portion of the step face 91*c*. Further, there occurs a gap x between the step face 91*c* and the upper end face 54*a* in case the guide member 54 is fixed to the transmission case 2, so that the support member 91 is allowed to rotate in the concave holding portion 92 within a specified range of this gap x. That is, the above-described step face 91*c* restricts an over rotation of the support member 91 beyond this specified range of the rotational direction by engaging with the guide member 54.

Hereinafter, the operation of the present embodiment will be described.

When the shift lever is shifted to the parking range, the manual shaft 41 and the detent plate 51 fixed to this shaft 41 rotate to a specified position, and the roller 55 at the tip of the detent spring 56 engages with the recess portion for parking range 51*a* of the detent plate 51. Thereby, the manual shaft 41 and the detent plate 51 are positioned at the specified position.

Figure 7:
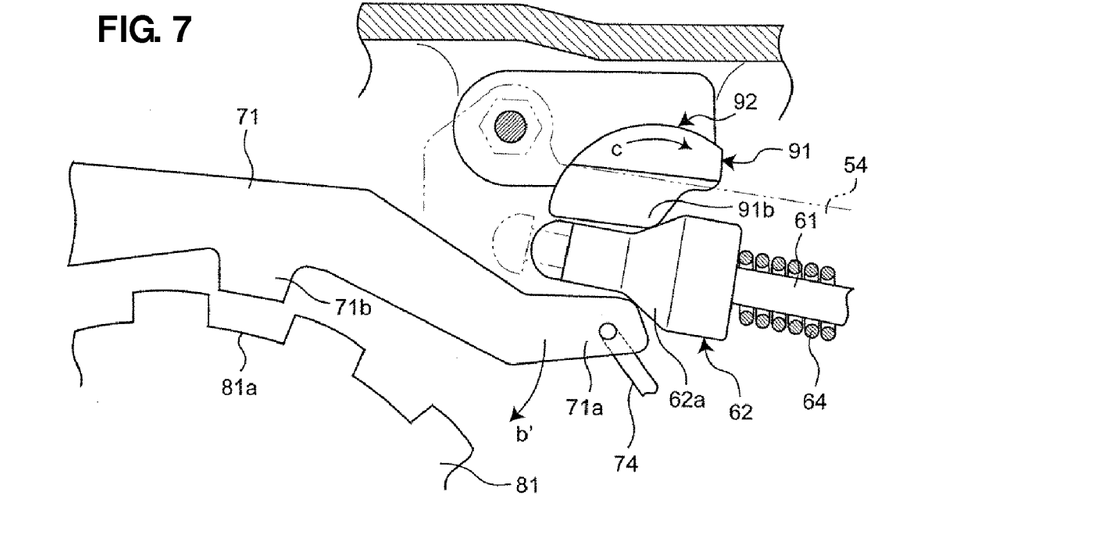
FIG. 7 is an explanatory diagram showing an initial stage of operation of the parking mechanism.

Herein, the parking rod 61 with the rear end portion 61*a* engaging with the detent plate 51 moves in the direction of the arrow a shown in FIGS. 2 and 3, so that the cam member 62 at the tip of the parking rod 61 also moves in the direction a. Accordingly, as shown in FIG. 7, the corn portion 62*a* of the central portion of the cam member 62 contacts the tip end portion 71*a* of the parking pole 71 positioned below it as well as the cam-contact portion (the second cylindrical outer face) 91*b* of the support member 91 positioned above it.

Then, when the cam member 62 moves further according to the move of the parking rod 61 in this direction a and the upper face of the corn portion 62*a* slides on the cam-contact portion 91*b* of the support member 91, the lower face of the corn portion 62*a* of the cam member 62 presses down the tip end portion 71*a* of the parking pole 71 so that the parking pole 71 swings downward (in the direction of an arrow b') against the biasing force of the spring 74.

Figure 8:
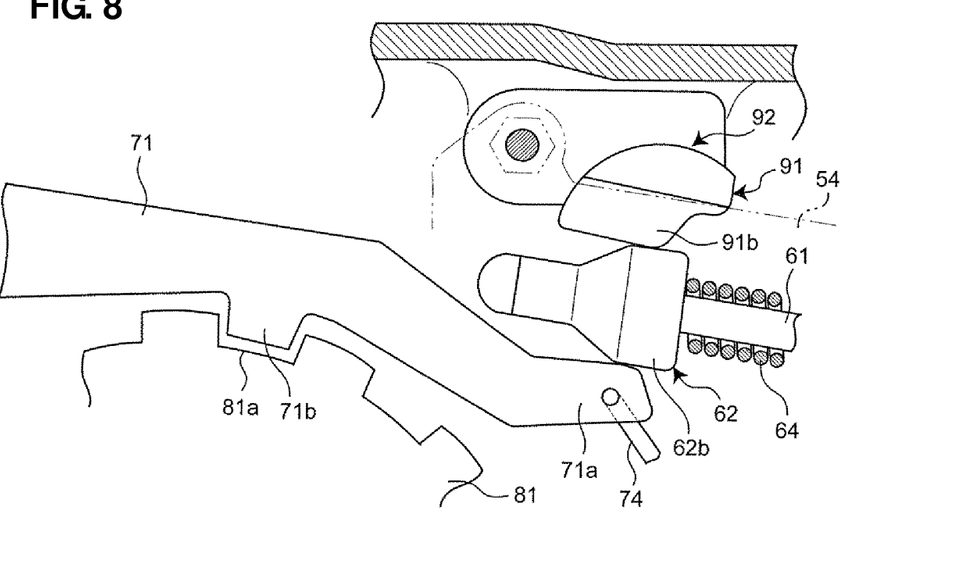
FIG. 8 is an explanatory diagram showing a terminal stage of operation of the parking mechanism.

In this case, as shown in FIG. 8, the pawl portion 71*b* of the parking pole 71 engages with the concave portion 81*a* between teeth of the parking gear 81, and a rear portion of the cylindrical portion 62*b* of the cam member 62 is positioned between the tip end portion 71*a* of the parking pole 71 and the cam-contact portion 91*b* of the support member 91 so that the parking pole 71 can lock the parking gear 81 through the engagement between the pawl portion 71*b* and the concave portion 81*a*.

Thus, the rotation of the parking gear 81 can be prevented, so that the secondary shaft 20, the differential gear 30 which engages with the second gear 22 of the secondary shaft 20, and the both wheel axels 32, 32 are locked in their rotations as well. Consequently, the automotive vehicle is locked in its stop state.

Herein, in case the tooth of the parking gear 81 is positioned right below the pawl portion 71*b* when the parking pole 71 swings downward, the pawl portion 71*b* cannot engage with the concave portion 81*a*. Accordingly, the corn portion 62*a* of the cam member 62 gets stuck between the tip end portion 71*b* of the parking pole 71 which is prevented from swinging downward and the cam-contact portion 91*b* of the support member 91, so that it becomes unable to move forward any more. In this case, as shown by broken lines in FIG. 7, the spring 64 which biases the cam member 26 forward contracts, so that only the parking rod 61 moves forward. Accordingly, the rotation of the shift lever or the manual shaft 41 is not prevented.

Herein, when the vehicle starts to move and the parking gear 81 rotates slightly, the pawl portion 71*b* comes to engage with the concave portion 81*a* of the parking gear 81. At this point, the rotation of the parking gear 81, that is, the move of the vehicle can be prevented.

Meanwhile, when the cam member 62 at the tip of the parking rod 61 presses down the tip end portion 71*a* of the parking pole 71 against the biasing force of the spring 74, its reaction force is received (supported) by the support member 91 positioned above the cam member 62. Herein, since the support member 91 is, as described above, allowed to rotate in the concave holding portion 92 with the rotational center O within the specified range of the gap x occurring between the step face 91c at the inside end face of the support member 91 and the upper end face 54a of the guide member 54, the support member 91 rotates slightly by a slide friction occurring between the cam-contact portion 91b and the cam member 62 (see an arrow c in FIG. 7).

Herein, since the cam-contact portion 91b is the second cylindrical face having the radius R2 with the center O which is positioned at the rotational center of the support member 91, even if the support member 91 rotates in the concave holding portion 92, the contact position with the cam member 62 at the cam-contact portion 91b can be maintained at the constant position relative to the transmission case 2.

Accordingly, the reaction force acting on the cam member 62 which comes in between the support member 91 and the parking pole 71 can be received by the support member 91 always at the specified position, so that the position, timing, and magnitude of load of the pressing of the cam member 62 against the parking rod 71 can be stabilized. Consequently, the proper operation of the parking mechanism can be obtained always.

Further, the reaction inputted to the support member 91 from the cam member 62 is directly transmitted to the first cylindrical outer face 91a of the support member 91, and then received by the concave inner face 92 of the concave holding portion 92 which contacts this first cylindrical outer face 91a of the support member 91 in the wide range because the curvature of the concave inner face 92 is the large radius R1 as well. Accordingly, the support member 91 can be held firmly at the concave inner face 92 or the transmission case 2. Thereby, the proper operation and the superior durability of the parking mechanism 60 can be obtained.

Since the member that prevents the support member 91 from dropping from the concave holding portion 92 is comprised of the guide member 54 which guides the movement of the cam member 62 when the parking rod 61 moves, the proper holing of the support member 91 can be achieved without increasing the number of parts. Further, since the detent spring 56 of the positioning mechanism 50 is held by using the guide member 54, the increase of the number of parts can be restrained as well.

Moreover, since it is configured that the gap x is formed between the step face 91c at the inside end face of the support member 91 and the upper end face 54a of the guide member 54, the support member 91 can be easily configured to be allowed to rotate in the concave holding portion 92 within the specified range without provided any particular means.

Further, when the guide member 54 is attached to the transmission case 2 with the bolts 52, 53 in a state where the support member 91 is put into the concave holding portion 92 of the transmission case 2, it may be unnecessary to hold the position of the support member at the specified position accurately because of the existence of the gap x, and thereby the attaching work can be easier. Also, this gap x may properly absorb any dimension error of the guide member 54, or any position error of screw holes of the bolts 52, 53 at the transmission case 2, so that the manufacturing can be easier.

Since the move direction of the parking rod 61, that is, the direction of the cam member 62 coming in between the parking pole 71 and the support member 91 substantially matches the swing face of the parking pole 71, the pressing force of the cam member 62 is directed substantially along the swing face of the parking pole 71. Accordingly, it can be restrained for any other component force than the force acting in the swing direction to act on the parking pole 71, so that the parking pole 71 can move smoothly.

However, the move direction of the parking rod, that is, the direction of the cam member coming in between the parking pole and the support member may be set to be the one which crosses the swing face of the parking rod. In this case, the support member is configured to rotate in a face which is substantially along the direction of the cam member coming in.

The present invention should not be limited to the above-described embodiment, and any other modifications or improvements can be applied within the scope of a sprit of the present invention.

What is claimed is:

1. A parking device of a transmission, comprising:
a parking gear provided in a transmission case at a rotational axis which rotates together with a wheel axel;
a parking pole provided in the transmission case so as to swing, the parking pole having a pawl portion which locks the parking gear through an engagement therebetween;
a parking rod provided in the transmission case so as to move together with an operation of a shift lever, the parking rod having a cam portion which presses the parking pole so as to make the engagement between the pawl portion of the parking pole and the parking gear according to the operation of the shift lever;
a support member provided in the transmission case beside the cam portion of the parking rod on an opposite side to the parking pole so as to be held at the transmission case, the support member receiving a reaction force which acts on the cam portion which occurs in case of pressing of the cam portion against the parking pole; and
a concave holding portion formed at the transmission case so as to hold the support member,
wherein the support member comprises a first cylindrical outer face having a curvature of a first radius which is positioned on the side of said concave holding portion so as to contact and slide along a concave inner face of said concave holding portion in a specified range of a rotational direction and a second cylindrical outer face having a curvature of a second radius which is positioned on the side of said cam portion of the parking rod so as to contact and slide on a surface of the cam portion, the curvature of the first radius of said first cylindrical outer face having a center which is located at the same position as that of the curvature of the second radius of said second cylindrical outer face, the second radius being smaller than the first radius.

2. The parking device of a transmission of claim 1, wherein a guide member to guide movement of said cam portion of the parking rod is fixed to the transmission case, and said guide member contacts an inside end face of said support member so that the support member can be prevented from dropping from said concave holding portion.

3. The parking device of a transmission of claim 2, wherein a step portion is formed at said inside end face of the support member so as to restrict an over rotation of the support member beyond said specified range of the rotational direction by engaging with said guide member.

4. The parking device of a transmission of claim 3, wherein a detent plate to move said parking rod together with the operation of the shift lever is provided, and a detent spring to constitute a positioning mechanism of the shift lever along with said detent plate is attached to said guide member.

5. The parking device of a transmission of claim 4, wherein said cam portion of the parking rod moves substantially in a swing face of the parking pole.

6. The parking device of a transmission of claim 2, wherein a detent plate to move said parking rod together with the operation of the shift lever is provided, and a detent spring to constitute a positioning mechanism of the shift lever along with said detent plate is attached to said guide member.

7. The parking device of a transmission of claim 6, wherein said cam portion of the parking rod moves substantially in a swing face of the parking pole.

8. The parking device of a transmission of claim 1, wherein said cam portion of the parking rod moves substantially in a swing face of the parking pole.

* * * * *